United States Patent [19]
Honis

[11] Patent Number: 5,251,283
[45] Date of Patent: Oct. 5, 1993

[54] SPEECH RECOGNITION SYSTEM WITH AN AUTOMATIC ADAPTIVE LEARNING DEVICE

[75] Inventor: Rudolf Honis, Vienna, Austria

[73] Assignee: U.S. Philips Corporation, New York, N.Y.

[21] Appl. No.: 446,495

[22] Filed: Dec. 4, 1989

[30] Foreign Application Priority Data

Dec. 7, 1988 [AT] Austria ................... 3002/88

[51] Int. Cl.$^5$ ................................. G10L 9/00
[52] U.S. Cl. ......................................... 395/2
[58] Field of Search ........................... 381/41–46; 364/513.5; 369/29

[56] References Cited

U.S. PATENT DOCUMENTS

| | | | |
|---|---|---|---|
| 4,069,393 | 1/1978 | Martin et al. | 381/43 |
| 4,618,984 | 10/1986 | Das et al. | 381/43 |
| 4,633,499 | 12/1986 | Nishioka et al. | 381/43 |
| 4,720,802 | 1/1988 | Damoulakis et al. | 364/513.5 |
| 4,776,016 | 10/1988 | Hansen | 381/43 |
| 4,866,778 | 9/1989 | Baker | 364/513.5 |
| 4,975,896 | 12/1990 | D'Agosto, III et al. | 369/29 |

OTHER PUBLICATIONS

E. G. Nassimbene, "Speech Input Technique For Data Entry to Word Processing Equipment", IBM Technical Disclosure Bulletin, vol. 22, No. 7, Dec. 1979, pp. 2891–2892.

*Primary Examiner*—Michael R. Fleming
*Assistant Examiner*—Michelle Doerrler
*Attorney, Agent, or Firm*—Bernard Franzblau

[57] ABSTRACT

A speech-recognition system includes a speech-recognition arrangement (1) and a learning device (5) for adapting the speech-recognition arrangement to the characteristic pronunciation of a given speaker during an adaptive learning mode. Certain words are applied during a learning procedure to the speech-recognition arrangement via a keyboard and, in addition, the sound signals associated with these certain words and originating from the given speaker are fed-in via a microphone. The sound signals corresponding to a spoken text are fed into the speech-recognition arrangement via a storage medium which can be scanned by a reproducing device. The reproducing device may be implemented in the form of a recording and reproducing device (7). The sound signals which are fed in to the system during a learning procedure of the speech-recognition arrangement are first recorded onto the storage medium and immediately thereafter are scanned from the storage medium and are fed into the speech-recognition arrangement.

3 Claims, 1 Drawing Sheet

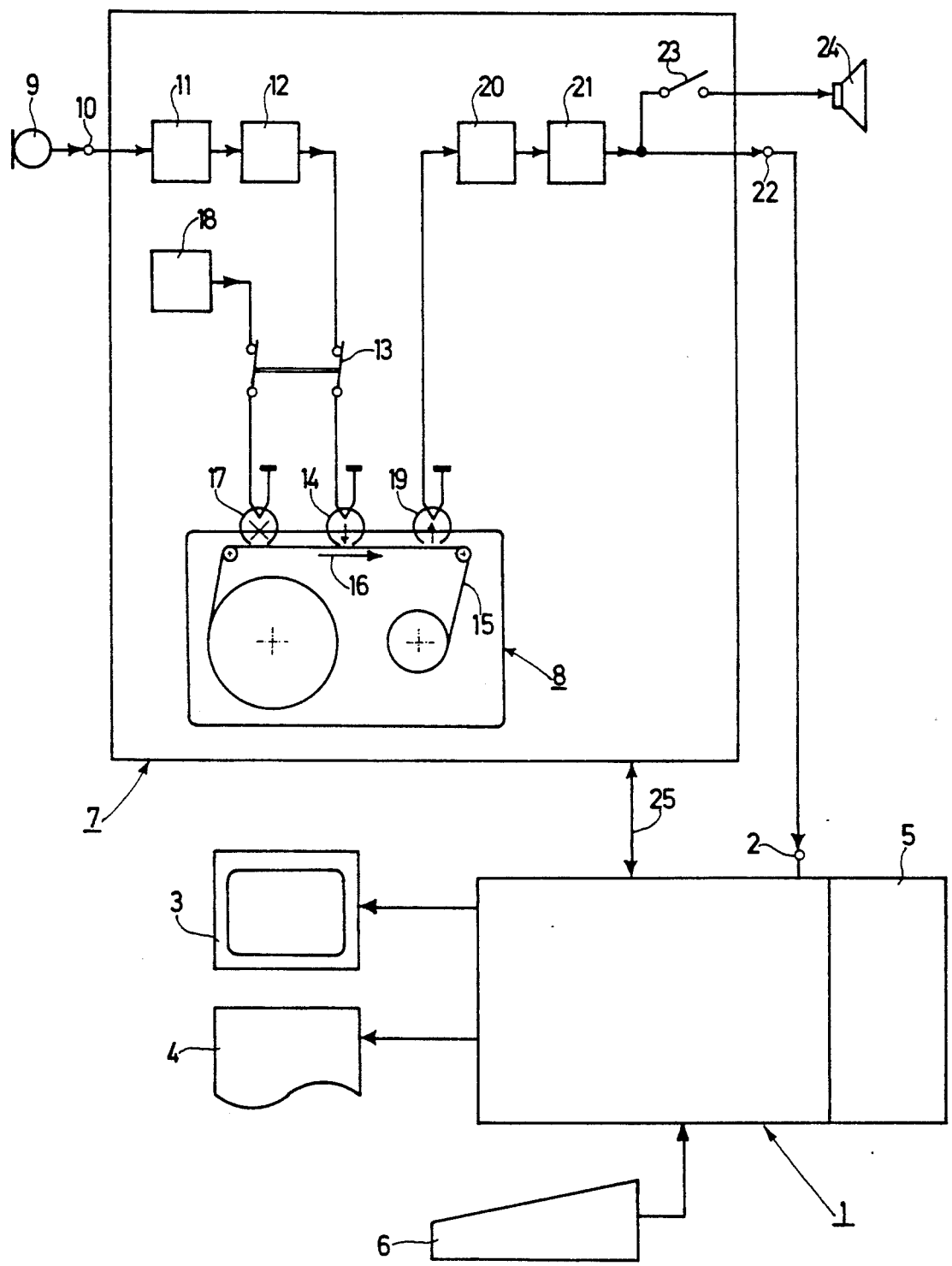

SPEECH RECOGNITION SYSTEM WITH AN AUTOMATIC ADAPTIVE LEARNING DEVICE

BACKGROUND OF THE INVENTION

This invention relates to a speech-recognition system, in which a speech-recognition arrangement includes a learning device for adapting the speech-recognition arrangement to the characteristic pronunciation of a given speaker. Certain given words are applied, during a learning procedure, to the speech-recognition arrangement via a keyboard and, the sound signals associated with these certain words and originating from the relevant speaker also are applied to the speech recognition arrangement via a microphone. Details of the progress of the learning procedure are displayed on a display screen, to which the relevant speaker is to react. After the learning procedure of the speech-recognition arrangement has been terminated, the sound signal corresponding to a text can be inputted, from which the speech-recognition arrangement determines the individual words contained therein. Such systems are commercially available. In the course of a given speaker-oriented learning procedure of such a system the speaker must pronounce each given word for a period of time until the display screen displays an acknowledgement that each such given word has been correctly learned and recognized. The speaker usually speaks into a microphone whose electric signals are then applied to the speech-recognition arrangement. After termination of the learning procedure, the sound signals corresponding to a spoken text can then be fed into the system, which signals are then recognized and displayed by the system as individual words. When such sound signals corresponding to a text are again applied to the speech-recognition arrangement via a microphone, such a system usually functions satisfactorily. If, however, a different manner of feeding-in the sound signals corresponding to a text is chosen, a different transmission path then is present between the microphone and the speech-recognition arrangement. As a result, difficulties in the speech-recognition arrangement then occur with the effect that the individual words are not correctly determined. This is based on the fact that the sound signals are altered as they pass through the different transmission path and thus do not fully correspond any more to the sound signals used during the learning procedure. This may, for example, happen when a speech-recognition system is used to which sound signals corresponding to a text are applied via a dictating machine arrangement, for example, as described in IBM Technical Disclosure Bulletin Vol. 22, no. 7, December 1979, pp. 2891 and 2892. Feeding in sound signals corresponding to a text via a dictating machine arrangement is advantageous in that the person dictating the text is not physically restricted to the place where the speech-recognition system is located.

SUMMARY OF THE INVENTION

An object of the invention is to obviate said difficulties in a speech-recognition system of the type defined in the opening paragraph and to provide a system in which both the learning procedure can be simple and reliable and the speech-recognition of words contained in a spoken text occurs with the lowest possible error rate. The invention is based on the recognition that basically the same signal transmission path should be used for both speech feed-in during a learning procedure and for the speech feed-in of texts, wherein the signal transmission path for the learning procedure is structured such that an immediate reaction of the speaker to the certain given spoken words to be learned is possible. Therefore, the invention is characterized in that the sound signals corresponding to a text are fed in via a display device-scannable storage medium of the speech-recognition arrangement, that the display device is additionally implemented as a recording device in the form of a recording and reproducing device and that sound signals which are fed-in during the learning procedure of the speech-recognition arrangement are first stored in the storage medium by means of the recording and reproducing device and subsequent thereto are again scanned by the storage medium and fed into the speech-recognition arrangement. Thus, an interactive learning procedure is made possible which uses the same signal transmission path as is afterwards present in the course of the feeding in of an spoken text. It should here be noted that it is known per se to record sound signals on a storage medium in the form of a magnetic tape, and to reproduce them immediately subsequent thereto from the storage medium so as to monitor the sound recording, i.e. to determine whether it is indeed correct, as is disclosed in, for example, the DE-AS 1,059,204, which however has no relation whatsoever to a system of speech-recognition. It should further be noted that it is also already known to apply to a speech-recognition system for a learning procedure the sound signals, recorded on a magnetic tape, of the given words to be learned, as is disclosed in the DE-OS 3518337. In such a case no immediate reaction of the relevant speaker is however possible. As a result, it is not known whether the relevant words are indeed correctly learned and recognized in the course of the learning procedure. This significantly complicates the learning procedure, as, when it appears afterwards that the recorded sound signals are not suitable for a learning procedure, all the required sound signals must again be recorded. In contradistinction thereto, the system according to the invention allows of an interactive learning procedure in which the relevant speaker can immediately react to a correct or faulty determination of the words.

BRIEF DESCRIPTION OF THE DRAWING

The invention will now be described in greater detail with reference to the accompanying drawing, in which an embodiment of the invention is shown, but to which embodiment the invention is not limited. The FIGURE shown in the drawing is a block circuit diagram of a speech-recognition system.

DESCRIPTION OF THE PREFERRED EMBODIMENT

In the block circuit diagram of FIG. 1 the drawing, reference numeral 1 denotes a speech-recognition arrangement which at its input 2 receives sound signals which correspond to a text, but in the form of corresponding electric signals, which are then analysed and processed by the speech-recognition arrangement to determine the individual words contained therein and which provides information signals relating to recognized speech signals which can then be displayed at an output of the system, e.g. as a text on a display screen 3 or printed by means of a printer. To ensure that the words contained in the text can be recognized unambiguously with the lowest possible error rate, consequently the number of incorrectly determined words is as low as possible, the speech-recognition arrangement 1 includes a learning device 5 by means of which the speech-recognition arrangement is adapted to the characteristic pronunciation of a given speaker in its own learning procedure. In the course of such a learning procedure certain given words are consecutively fed into the speech-recognition arrangement 1 via a keyboard 6, while said speaker to which the system is to be adapted speaks these words separately into a microphone, from which the sound signals are applied as electric signals to the input 2 of the speech-recognition arrangement. In this situation it is often required that an individual word of the speaker be pronounced several times in order to give the speech-recognition arrangement an opportunity to determine or learn the relevant word correctly with the aid of the learning device. Data about the progress of the learning procedure is shown to the speaker via the display screen 3, such as, for example, "too softly spoken", "repeat" or finally "word recognized". Consequently, the speaker must react during the learning procedure to the data displayed on the display screen. When the learning procedure is terminated, then the sound signals corresponding to a text can be fed into the speech-recognition arrangement, from which the speech-recognition arrangement determines the individual words contained therein.

In the present case, an apparatus is provided by which the sound signals corresponding to a text are fed into the speech-recognition arrangement in a known manner via a storage medium which is scanned by a display device. The choice of the storage medium itself can be made in the widest, optional sense, which also holds for the type and manner of storage. The storage medium can, for example, be a magnetic tape or a magnetic disc. Signal storage itself can be effected in both the analog and the digital form. Thus, a special signal transmission path, which influences the sound signals supplied by the microphone, is present between the microphone, into which the speaker speaks, and the input 2 of the speech-recognition arrangement 1.

Accordingly, it is now provided that for a learning procedure of the speech-recognition arrangement there is a basically identical signal transmission path between the microphone in which the speaker speaks the words to be learned, and the input 2 of the speech-recognition arrangement 1, as will be present at the feed-in of spoken texts. Thus, in the course of a learning procedure the sound signals applied to the speech-recognition arrangement are influenced in the same manner as the sound signals applied subsequent to the learning procedure, which correspond to a text, and from which the speech-recognition arrangement is to determine the individual words. Because of such an identical influence on the sound signals, a low error rate is achieved in the recognition of the words contained in a text. As a result, the number of words which are incorrectly determined by the speech-recognition arrangement is very low.

In order to achieve the foregoing, the display device, via which the sound signals corresponding to a spoken text are fed into the speech-recognition arrangement from a storage medium, is additionally structured as a recording device in the form of a recording and reproducing device 7. In the apparatus 7 the sound signals which are fed into the speech-recognition arrangement 1 during a learning procedure are first recorded on the storage medium and immediately subsequent thereto are scanned again by the storage medium (i.e. in a direct reproduce after recording mode) and fed into the speech-recognition arrangement. In the present case it is assumed that the storage medium is constituted by a magnetic tape cassette 8. The sound signals originating from a microphone 9 are applied to an input 10 of the recording and display device 7, from which they arrive at an amplifier 11 and a signal processing circuit 12, in which the signals can be influenced as regards their frequency swing and any noise present. From this signal processing circuit 12 the sound signals arrive via a switching arrangement 13 at a recording head 14 which cooperates with a magnetic tape 15 present in the magnetic tape cassette 8. In the customary manner, an erase head 17, which can be connected to an oscillator 18 via the switching arrangement 13 to erase any signals present on the magnetic tape before a recording, is disposed before the recording head 14 in the direction of travel of the tape, indicated by an arrow 16. Seen again in the direction of travel of the tape, a reproducing head 19 is arranged subsequent to the recording head 14, with the aid of which sound signals recorded on the magnetic tape can be scanned from the magnetic tape immediately subsequent thereto (direct reproduce after recording mode of operation). From the reproducing head 19 the scanned sound signals are applied again to an amplifier 20 and optionally to a signal processing circuit 21 from which they are supplied to an output 22 of the recording and reproducing device 7. The sound signals can be applied to the input 2 of the speech-recognition arrangement 1 from this output 22. A loudspeaker 24, by means of which the signals scanned from the magnetic head can optionally be reproduced, may be connected to the output of the signal processing circuit 21, for example, via a switch 23. Further control lines are indicated by a double arrow 25, by means of which it is optionally possible to interchange mutual control commands between the recording and reproducing device 7 and the speech-recognition arrangement 1.

In the course of a learning procedure of the speech-recognition arrangement, the sound signals coming from the microphone 9 are now recorded on the magnetic tape 15 by means of the recording head 14 and immediately subsequent thereto are scanned again by the reproducing head 19 from the magnetic tape and applied to the input 2 of the speech-recognition arrangement, in which the learning procedure already described in the foregoing is in progress, whose results are then displayed on the display screen 3. Consequently, the speaker of the words to be learned can directly follow the learning procedure and react to its results. By such an interactively progressing learning procedure the learning procedure can consequently rapidly and reliably be brought to an end.

Subsequent to such a learning procedure the sound signals corresponding to a text can then be fed into the speech-recognition arrangement via the recording and reproducing device. There are then two possibilities, namely that either the speech-recognition arrangement 1 operates in real time, so simultaneously with the recording and immediately subsequent reproduction of the sound signals corresponding to a text on or from the storage medium, or, independently of a recording of the sound signals corresponding to a text on the storage medium, so at an instant which is later than the recording, at which later instant then the sound signals already recorded on the storage medium are again reproduced from this medium. Thus, in the first-mentioned case, the sound signals corresponding to a text are evaluated substantially immediately by the speech-recognition arrangement, in contradistinction to which, in said second case, such an evaluation can be effected at any instant later than the storage of the sound signals. The recording and reproducing device 7 used therein for storing the sound signals can then be constituted as a commercially available dictating machine, but with the difference that it is equipped with a separate reproducing head, with which the signal recorded on the storage medium can also be scanned from the storage medium immediately subsequent thereto. Furthermore, it is also possible to record the sound signals corresponding to a text on the storage medium of a separate recording device, such as, for example, a pocket dictating machine, whereafter, after the recording has ended, the storage medium is removed from the separate recording device and subsequently placed in the recording and reproducing device 7 connected to the speech-recognition arrangement 1.

In such a case only a display mode of the recording and reproducing device 7 is required, which implies that the recording feature can be inhibited via the switching device 13.

It will be obvious that by using a speech-identification system of the type described in the foregoing, a learning procedure of the speech-recognition arrangement can be effected in a simple and reliable way in an interactive manner. In addition, a good quality of the speech-recognition is obtained as both the feed-in of the sound signals in the learning procedure and the feed-in of the sound signals corresponding to a spoken text utilize a signal transmission path from the microphone to the input of the speech-recognition arrangement having the same properties. Obviously, within the scope of the invention, there are a still further number of possible modifications of the embodiment described in the foregoing. For example, various other embodiments of the type and manner of implementing the recording and display device can be mentioned.

I claim:

1. A speech-recognition system comprising: a speech-recognition arrangement including means for recognizing speech signals applied to the system and means for applying information signals relating to recognized speech signals to an output of the system, a learning device which interacts with the speech-recognition arrangement during an adaptive learning mode and includes means for adapting the speech-recognition arrangement to the characteristic pronunciation of a given speaker, a keyboard for applying certain words to the speech-recognition arrangement during a learning procedure, a microphone for converting sound signals associated with said certain words and originating from the given speaker to electric speech signals and for applying said speech signals to the speech-recognition arrangement, wherein said speech-recognition arrangement also includes means for determining the progress of the learning procedure in the learning mode, means for displaying details of the learning procedure progress in the learning mode on a display screen, to which the given speaker is to react, characterized in that in normal operation of the system electric speech signals corresponding to a text are fed in to the system via a scannable storage medium in a recording and reproducing device, and wherein electric speech signals which are fed in to the system during the learning procedure of the speech-recognition arrangement are first stored in a storage medium of the recording and reproducing device and subsequent thereto are scanned from the storage medium and fed in to the speech-recognition arrangement, said storage medium having a transmission characteristic that closely approximates the transmission characteristic of said scannable storage medium.

2. A speech-recognition system as claimed in claim 1 wherein said recording and reproducing device comprises:
   a signal processing circuit coupling said microphone to a recording head located adjacent a magnetic recording medium, and
   a reading head located adjacent the magnetic recording medium and coupled via a second signal processing circuit to a signal input of the speech-recognition arrangement.

3. A speech-recognition system comprising:
   a speech-recognition arrangement for recognizing speech signals applied to the system and for applying information relating to recognized speech signals to an output, a learning device which interacts with the speech-recognition arrangement in an adaptive learning mode of the speech-recognition arrangement and, in order to adapt the speech-recognition arrangement to a characteristic pronunciation of a given speaker, comprises means including a microphone for applying spoken words to the system in the learning mode via a recording and reproducing device having a storage device, means including the speech-recognition arrangement and the learning device for determining the progress of a learning operation in the learning mode, display means for displaying details of the progress in the learning mode on a display screen, to which the given speaker is to react, the recording and reproducing means recording electric sound signals corresponding to the spoken words on the storage device and reproducing the electric sound signals recorded in a direct reproduce after recording mode of operation as a part of the learning operation, wherein, during normal operation of the system electric speech signals are fed in to the system via a scannable storage medium in a further recording and reproducing device, said scannable storage medium having a transmission characteristic that closely approximates the transmission characteristic of the storage device.

* * * * *